(12) United States Patent
Nakayama

(10) Patent No.: US 11,518,360 B2
(45) Date of Patent: Dec. 6, 2022

(54) CONTROL DEVICE AND CONTROL METHOD

(71) Applicant: TOYOTA JIDOSHA KABUSHIKI KAISHA, Toyota (JP)

(72) Inventor: Shu Nakayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 16/898,534

(22) Filed: Jun. 11, 2020

(65) Prior Publication Data

US 2021/0009102 A1   Jan. 14, 2021

(30) Foreign Application Priority Data

Jul. 11, 2019   (JP) .............................. JP2019-129328

(51) Int. Cl.
| | | |
|---|---|---|
| *B60R 16/03* | (2006.01) | |
| *B60T 13/74* | (2006.01) | |
| *B60T 17/18* | (2006.01) | |
| *B60T 7/12* | (2006.01) | |
| *B60T 8/88* | (2006.01) | |

(52) U.S. Cl.
CPC .............. *B60T 17/18* (2013.01); *B60R 16/03* (2013.01); *B60T 7/12* (2013.01); *B60T 8/885* (2013.01); *B60T 13/746* (2013.01)

(58) Field of Classification Search
CPC ..... B60R 16/03; B60R 16/033; B60T 13/741; B60T 13/74; B60T 7/12; B60T 2270/414; B60T 2270/84
See application file for complete search history.

(56) References Cited

U.S. PATENT DOCUMENTS

| | | | | |
|---|---|---|---|---|
| 2015/0012175 A1* | 1/2015 | Hara | ..................... | B60W 10/06 |
| | | | | 701/36 |
| 2018/0241225 A1* | 8/2018 | Shirai | ................ | G01R 31/3842 |
| 2019/0061653 A1* | 2/2019 | Takahashi | ............... | B60R 16/03 |
| 2019/0232902 A1* | 8/2019 | Teng | ....................... | B60T 17/22 |

FOREIGN PATENT DOCUMENTS

| | | | |
|---|---|---|---|
| JP | 2004-322987 A | | 11/2004 |
| JP | 2004322987 A | * | 11/2004 |
| JP | 2006298240 A | * | 11/2006 |
| JP | 2008222122 A | * | 9/2008 |
| JP | 2015-160591 A | | 9/2015 |
| JP | 2018061304 A | * | 4/2018 |
| WO | WO-2018190338 A1 | * | 10/2018 |

* cited by examiner

*Primary Examiner* — Robert A. Siconolfi
*Assistant Examiner* — Stephen M Bowes
(74) *Attorney, Agent, or Firm* — Oliff PLC

(57) ABSTRACT

A controller includes a failure detection unit that detects a failure in a first power supply system, and a power supply system control unit that closes a relay in a case where an execution of an automatic parking function starts and, during the execution of the function, causes the first power supply system to supply power, without causing a second power supply system to supply power, to the electric brake device, by setting a target output voltage of the second power supply system lower than an output voltage of the first power supply system when the failure detection unit does not detect the failure, and operates the electric brake device by setting the target output voltage to a voltage within a range in which the electric brake device is operable when the failure detection unit detects the failure.

8 Claims, 6 Drawing Sheets

CONTROL DEVICE AND CONTROL METHOD

CROSS-REFERENCE TO RELATED APPLICATION

This application claims priority to Japanese Patent Application No. 2019-129328 filed on Jul. 11, 2019, incorporated herein by reference in its entirety.

BACKGROUND

1. Technical Field

The disclosure relates to a control device and a control method for an electric brake device of a vehicle.

2. Description of Related Art

A vehicle having an automatic parking function for automatically executing parking is provided with an electric brake device that receives a command from an in-vehicle device which controls the automatic parking function instead of receiving a brake pedal operation from a user, and operates a brake. A technology is widely known in which two systems of a main power supply system and an auxiliary power supply system are provided as a power supply system that supplies power to the electric brake device, and, when the main power supply system fails, the vehicle is braked and stopped by urgently operating the electric brake device by the auxiliary power supply system.

For example, Japanese Unexamined Patent Application Publication No. 2015-160591 (JP 2015-160591 A) discloses an electric brake device provided with a power generation device that converts part of kinetic energy generated during traveling of a vehicle into electric energy and charges a backup power supply device with it, capable of driving an electric motor using the auxiliary power supply device when the power in the main power supply device does not reach a set reference.

In addition, Japanese Unexamined Patent Application Publication No. 2004-322987 (JP 2004-322987 A) discloses a power supply device for an electric brake which is provided with a main battery and an auxiliary power supply device composed of a capacitor, and supplies power from the auxiliary power supply device to the brake when an abnormality in which a voltage of the main battery is lower than a reference value is detected.

SUMMARY

In JP 2015-160591 A and JP 2004-322987 A, the auxiliary power supply system is electrically connected to the electric brake device after a failure in the main power supply system is detected. Such an electric connection is generally performed by using a relay, or the like. However, since an operation of the relay, or the like, requires a given time, there is a possibility that a time lag from the time when a failure in the main power supply system is detected to the time when power supply is started by the auxiliary power supply system occurs and a temporary blackout in power supply occurs. When the temporary blackout in power supply occurs during execution of automatic parking, the brake cannot operate during the blackout, such that it is impossible to immediately brake the vehicle.

The present disclosure provides a control device and a control method for an electric brake device that can quickly brake and stop a vehicle by using an auxiliary power supply system even when a main power supply system fails.

A first aspect of the present disclosure is a controller provided in a vehicle that includes an electric brake device, a first power supply system and a second power supply system configured to supply power to the electric brake device, and a relay provided between the electric brake device and the second power supply system. The controller includes a failure detection unit configured to detect a failure in the first power supply system, and a power supply system control unit configured to control power supply to the electric brake device based on a detection result of the failure detection unit. The power supply system control unit is configured to: close the relay in a case where an execution of an automatic parking function of a vehicle starts; cause, during the execution of the automatic parking function, the first power supply system to supply power to the electric brake device without causing the second power supply system to supply power to the electric brake device, by setting a target output voltage of the second power supply system to a first voltage which is lower than an output voltage of the first power supply system when the failure detection unit does not detect a failure in the first power supply system; and cause, during the execution of the automatic parking function, the second power supply system to supply power to the electric brake device by setting the target output voltage of the second power supply system to a voltage within a range in which the electric brake device is operable, when the failure detection unit detects the failure in the first power supply system.

In the first aspect, the second power supply system may include a capacitor as a power source. The power supply system control unit may perform a process of discharging the capacitor after an ignition is turned off.

In the first aspect, the power supply system control unit may acquire a voltage of the capacitor, and end the process of discharging when the voltage of the capacitor becomes lower than a predetermined lower limit voltage by the process of discharging.

In the first aspect, the failure detection unit may acquire the output voltage of the first power supply system, and detect the failure in the first power supply system when the output voltage of the first power supply system is equal to or lower than a predetermined failure detection voltage.

In the first aspect, the failure detection unit may detect the failure in the first power supply system when a state in which the output voltage of the first power supply system is equal to or lower than a predetermined failure detection voltage continues for a predetermined time.

In the first aspect, the power supply system control unit may acquire speed of the vehicle, and cause, during the execution of the automatic parking function, the second power supply system to supply power to the electric brake device by setting the target output voltage of the second power supply system to be higher than the first voltage when the first power supply system does not fail and the speed of the vehicle becomes lower than a predetermined speed.

In the first aspect, the target output voltage of the second power supply system may be determined based on a voltage of the capacitor.

In the first aspect, the predetermined speed may be set such that a certain power storage amount of the capacitor is secured even when the power supply is started from the second power supply system to the electric brake device, and then, when the first power supply system fails, the output voltage of the second power supply system is maintained at an operation voltage of the electric brake device until the vehicle is stopped.

A second aspect of the present disclosure is a control method of controlling a vehicle including an electric brake device, a first power supply system and a second power supply system configured to supply power to the electric brake device, and a relay provided between the electric brake device and the second power supply system. The control method includes a step of detecting a failure in the first power supply system, a step of closing the relay in a case where an execution of an automatic parking function of the vehicle starts, a step of causing, during the execution of the automatic parking function, the first power supply system to supply power to the electric brake device without causing the second power supply system to supply power to the electric brake device, by setting a target output voltage of the second power supply system to a first voltage which is lower than an output voltage of the first power supply system when the failure in the first power supply system is not detected, and a step of causing, during the execution of the automatic parking function, the second power supply system to supply power to the electric brake device by setting the target output voltage of the second power supply system to a voltage within a range in which the electric brake device is operable, when the failure in the first power supply system is detected.

With each aspect of the present disclosure, it is possible to provide a controller of an electric brake device that can remove a time lag caused by a relay operation for connecting a second power supply system, which is an auxiliary power supply system, when a first power supply system, which is a main power supply system, fails, thereby quickly braking and stopping a vehicle.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

In one embodiment of the present disclosure, it is possible to supply power from a first power supply system (a main power supply system) and a second power supply system (an auxiliary power supply system) to an electric brake device. The electric brake device and the second power supply system are connected to each other through a relay in advance at the start of execution of an automatic parking function. During the execution of the automatic parking function, when the first power supply system does not fail, a target output voltage of the second power supply system is set low such that power is supplied only from the first power supply system, not from the second power supply system. During the execution of the automatic parking function, when the first power supply system fails, the target output voltage of the second power supply system is set to a voltage in which the electric brake device can operate, and the vehicle is stopped by operating the electric brake device. As such, it is possible to remove a time lag caused by a relay operation for connecting the electric brake device to the second power supply system when the first power supply system fails, thereby braking and stopping the vehicle quickly compared to when the relay operation is performed after the first power supply system fails.

Hereinafter, one embodiment of the present disclosure will be described in detail with reference to drawings.

Embodiment

Configuration

Figure 1:
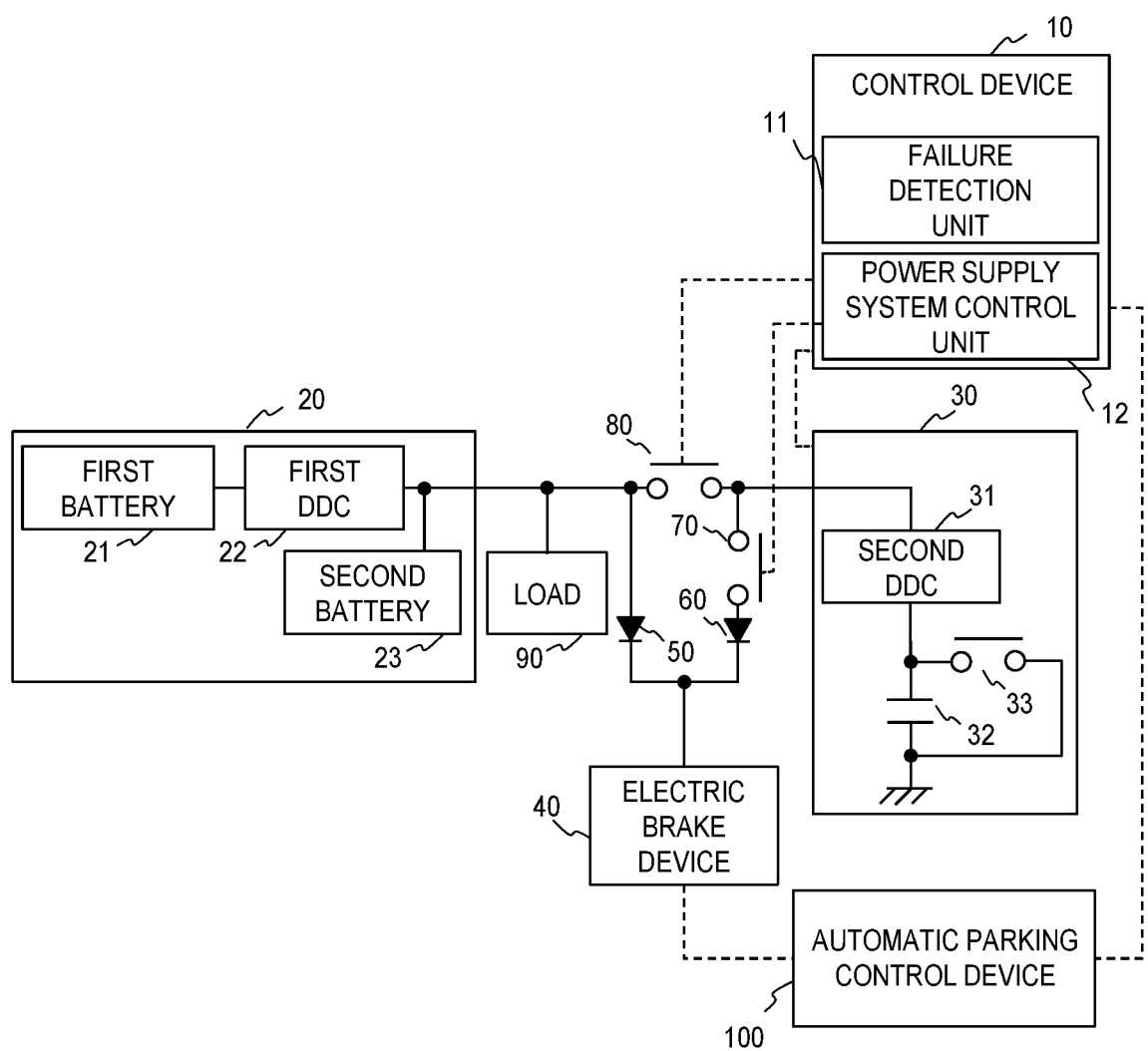
FIG. 1 is a diagram of a schematic configuration of a control device and the periphery thereof according to one embodiment.

FIG. 1 is a diagram illustrating a schematic configuration of a control device 10 mounted on a vehicle and the periphery of the control device 10 according to one embodiment of the present disclosure. Each configuration will be described with reference to FIG. 1. The type of the vehicle is not particularly limited, and examples thereof include a gasoline vehicle, a hybrid vehicle (HV), and an electric vehicle (EV). In FIG. 1, a power line is represented by a solid line, and a control signal line is represented by a dashed line.

Electric Brake Device

An electric brake device 40 brakes the vehicle based on a command from an automatic parking control device 100 to be described below. The electric brake device 40 includes an actuator, and a control unit that controls the actuator according to the command from the automatic parking control device 100. The electric brake device 40 can receive power supply from a first power supply system 20 and a second power supply system 30 to be described below. A type of the electric brake device 40 is not limited as long as it is a brake system (a brake-by-wire) that can be operated by an electric control signal from a vehicle-mounted device, such as the automatic parking control device 100. For example, the actuator may be an electric pump, a valve, or the like, that controls hydraulic pressure based on a control signal in a hydraulic brake. Alternatively, the actuator may be a motor that controls, instead of a booster, the hydraulic pressure based on the control signal in the electric brake control that can variably control the operation distribution between a regenerative brake and the hydraulic brake. Alternatively, the actuator may be an electric device that generates a driving force based on the control signal in a direct-drive electric brake that electrically generates the driving force of a friction member, such as a force for pressing a disc brake pad against a brake rotor (or a force for pressing a drum brake shoe against a brake drum), and directly transfers the driving force to the friction member without using the hydraulic pressure.

First Power Supply System

The first power supply system 20 is a main power supply system that supplies power to the electric brake device 40. The first power supply system 20 includes, for example, a first battery 21, a second battery 23, and a first DCDC converter (a first DDC) 22 provided therebetween.

The first battery 21 may be, for example, a lithium ion battery charged with power supplied from the outside of the vehicle or power generated by a generator provided in the vehicle. The second battery 23 may be, for example, a lead storage battery having an output voltage lower than that of the first battery 21. The first DCDC converter 22 converts the output of the first battery 21 into a predetermined voltage. The output from the first DCDC converter 22 and the output from the second battery 23 become the output from the first power supply system 20. The output of the first DCDC converter 22 is also used for charging the second battery 23. The first power supply system 20 may supply power to the control device 10, the automatic parking control device 100, or the like, and also supply power to one or more devices, such as a light (a load 90).

Second Power Supply System

The second power supply system 30 includes a second DCDC converter (a second DDC) 31, a capacitor 32 connected to the second DCDC converter 31, and a first relay 33. The first relay 33 is installed so as to be able to form a discharging path for the capacitor 32 by short-circuiting terminals of the capacitor 32 in a closed state. The capacitor 32 is a power source of the second power supply system 30.

The second DCDC converter 31 can perform a bidirectional voltage conversion output. Specifically, the second DCDC converter 31 converts the output of the capacitor 32 into a target output voltage to be described below, and makes it the output of the second power supply system 30. In addition, the second DCDC converter 31 converts the output of the first power supply system 20, supplied through a second relay 80 to be described below, into a predetermined voltage and supplies it to the capacitor 32, thereby charging the capacitor 32.

A first rectifier element (diode) 50 is installed between the first power supply system 20 and the electric brake device 40. The first rectifier element 50 has one end connected to the first power supply system 20 as an inflow side, and the other end connected to the electric brake device 40 as an outflow side.

A third relay 70 and a second rectifier element (diode) 60 are installed in series between the second power supply system 30 and the electric brake device 40. The second rectifier element 60 has one end connected to the second power supply system 30 as an inflow side, and the other end connected to the electric brake device 40 as an outflow side.

The second relay 80 is installed between the first power supply system 20 and the second power supply system 30.

The outflow sides of the first rectifier element 50 and the second rectifier element 60 are connected to each other and have the same potential. The above outflow sides may be connected outside the electric brake device 40 as illustrated, or inside the electric brake device 40.

Control Device

The control device 10 controls power supply from the second power supply system 30 to the electric brake device 40. The control device 10 includes a failure detection unit 11 and a power supply system control unit 12. The control device 10 is typically an electronic control unit (ECU) including a processor, a memory, an input/output interface, and the like.

The failure detection unit 11 detects whether there is a failure in the first power supply system 20. Although a method of detecting a failure by the failure detection unit 11 is not particularly limited, in the present embodiment, for example, the failure detection unit 11 detects a failure based on the output voltage of the first power supply system 20 measured by a voltage sensor (not shown).

The power supply system control unit 12 can acquire information indicating an execution state of an automatic parking function from the automatic parking control device 100, a detection result of a failure in the first power supply system 20 from the failure detection unit 11, and a measurement result of a voltage (a power storage amount) of the capacitor 32. Moreover, the power supply system control unit 12 can appropriately acquire information indicating a power supply state of an ignition on/off of the vehicle or information indicating various operation states of the vehicle, such as the speed of the vehicle, from various devices provided in the vehicle. The power supply system control unit 12 controls the first relay 33, the second relay 80, and the third relay 70 and sets a target output voltage of the second power supply system 30 by controlling the second DCDC converter 31 of the second power supply system 30, based on the states described above, the detection result of the failure in the first power supply system 20 acquired from the failure detection unit 11, and the like, thereby controlling power supply to the electric brake device 40.

Automatic Parking Control Device

The automatic parking control device 100 is installed in a vehicle for realizing the automatic parking function. Upon receiving a parking instruction from a user, the automatic parking control device 100 controls the vehicle by generating a command for controlling the driving force, a braking force, a steering angle, and the like, of the vehicle based on, for example, information on the vehicle and the surroundings thereof, measured by various sensors provided in the vehicle and outputting the command to a control device for an engine or a motor, an electric brake device 40, a steering control device, and the like, provided in the vehicle so that the vehicle can be automatically parked in a parking space.

Further, the type of the automatic parking function realized by the automatic parking control device 100 is not limited. Examples of the type of the automatic parking function include parking in a parking space according to an instruction from a user sitting in a driver's seat in the vicinity of the parking space, remote parking in the parking space according to an instruction from the user who has gotten off the vehicle in the vicinity of the parking space, and automatic valet parking in which the vehicle is moved from an entrance of the parking space to the parking space and parked in the parking space according to an instruction from the user who has gotten off the vehicle at the entrance of the parking space.

Control

Figure 2:
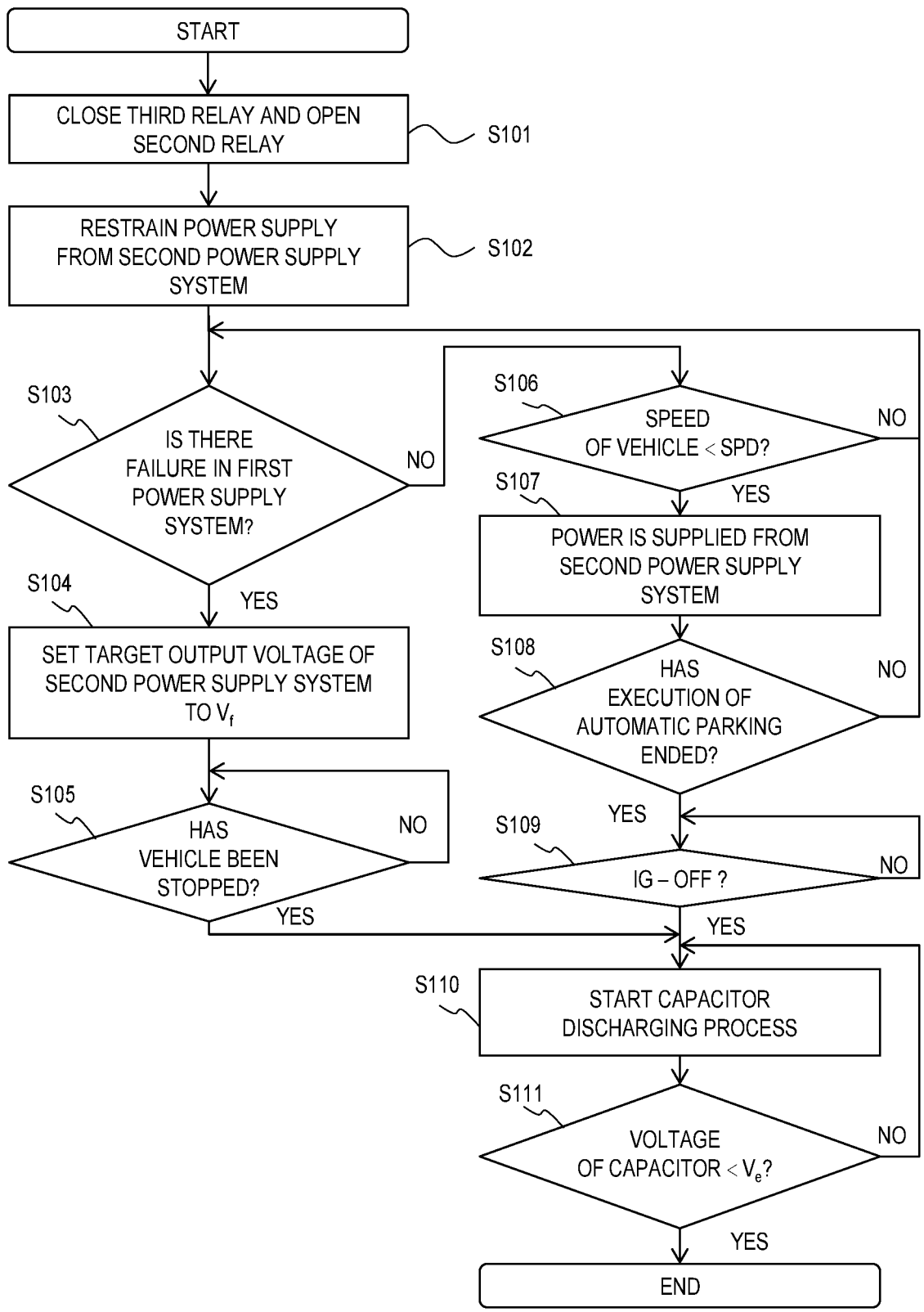
FIG. 2 is a flowchart of control performed by the control device according to one embodiment.

The control of the power supply system performed by the control device 10 during the execution of the automatic parking function will be described with further reference to the drawings. FIG. 2 is a flowchart illustrating a sequence of control processing performed by the control device 10. FIGS. 3 to 6 are diagrams describing electric connection states between the first power supply system 20, the second power supply system 30, and the electric brake device 40. In FIGS. 3 to 6, connection paths defined by the states of the first relay 33, the second relay 80, and the third relay 70 are represented by thick hatched lines. The control illustrated in FIG. 2 is an example of control which starts from the execution of the automatic parking function by the automatic parking control device 100 according to an instruction from a user.

Figure 3:
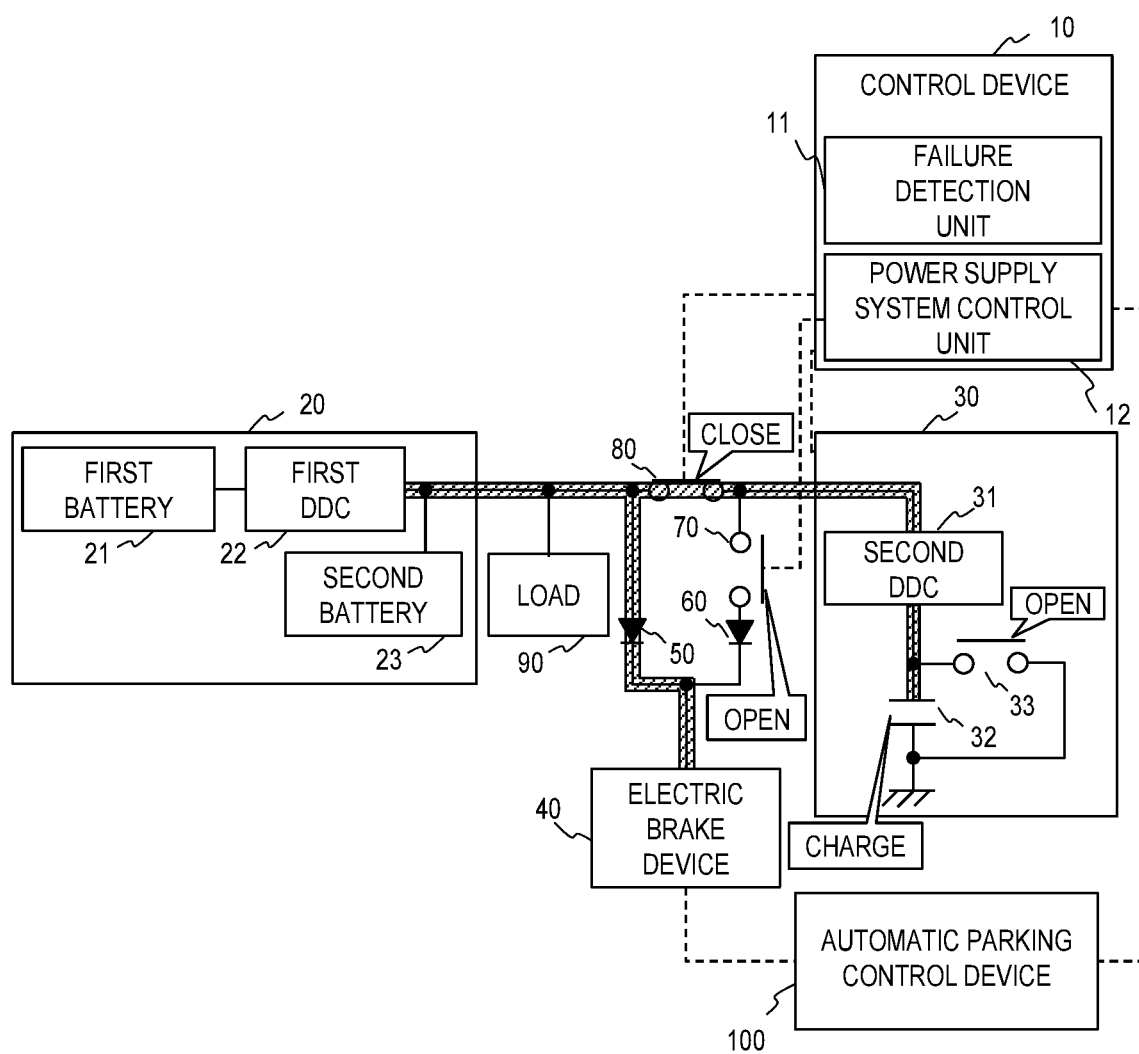
FIG. 3 is a diagram describing the control by the control device according to one embodiment.

FIG. 3 illustrates a connection state before the start of the execution of the automatic parking function in an ignition-on state of the vehicle. In a state before the start of the execution of the automatic parking function, the power supply system control unit 12 of the control device 10 opens the third relay 70, and the output of the second power supply system 30 is not connected to the electric brake device 40. Therefore, the electric brake device 40 is supplied with power only from the first power supply system 20. In addition, the power supply system control unit 12 of the control device 10 charges the capacitor 32 with the output of the first power supply system 20 by opening the first relay 33 and closing the second relay 80.

A process performed by the control device 10 when the automatic parking function is performed will be described with reference to FIG. 2.

Step S101: When acquiring information indicating that the execution of the automatic parking function has been started from the automatic parking control device 100, the power supply system control unit 12 closes the third relay 70 and opens the second relay 80.

Figure 4:
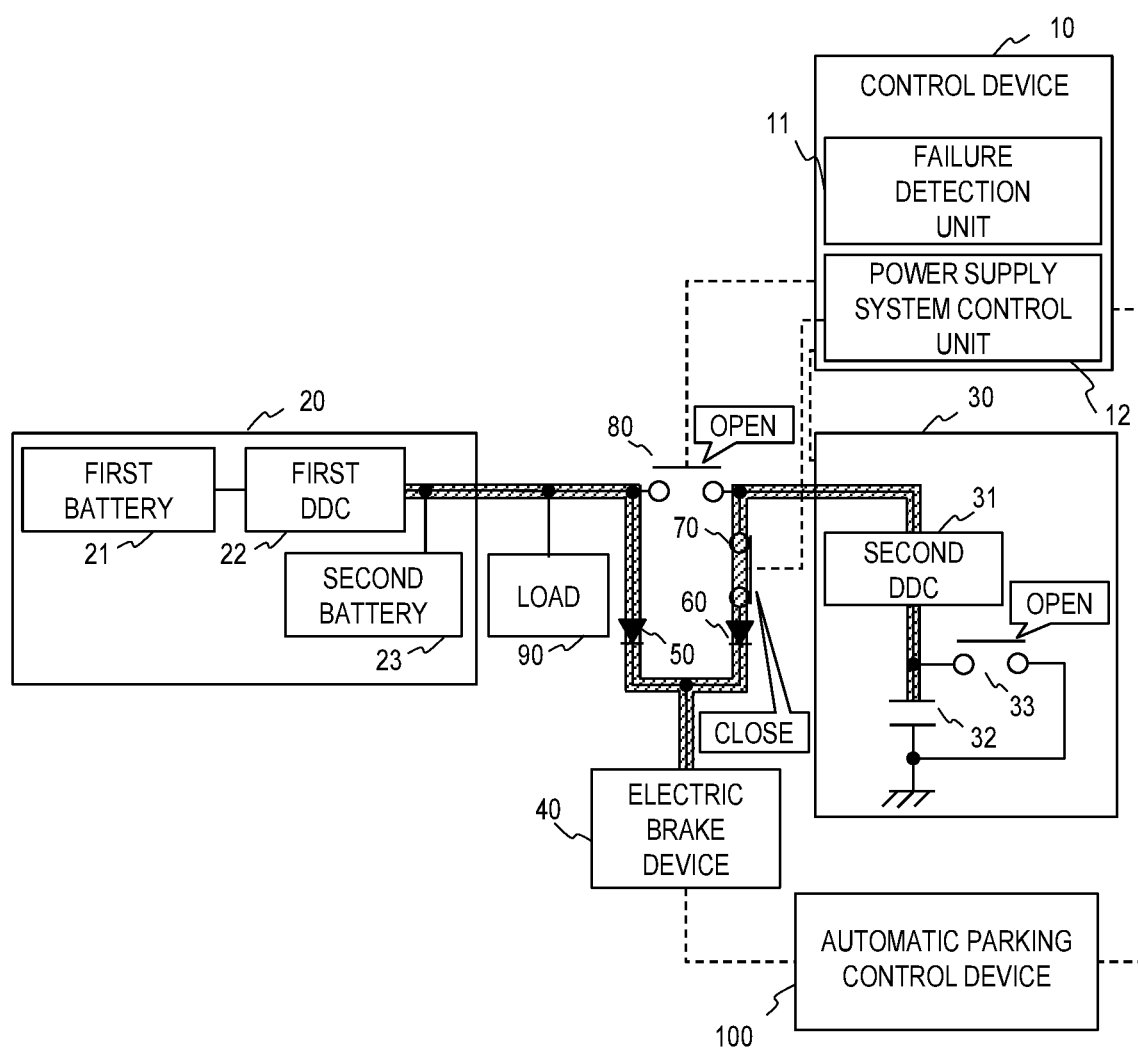
FIG. 4 is another diagram describing the control by the control device according to one embodiment.

By the above process, not only the first power supply system 20 but also the second power supply system 30 can respectively supply power to the electric brake device 40, as illustrated in FIG. 4.

Step S102: The power supply system control unit 12 restrains power supply from the second power supply system 30 to the electric brake device 40 by controlling the target output voltage of the second power supply system 30 when the first power supply system 20 does not fail. In the present embodiment, the power supply system control unit 12 restrains power supply from the second power supply system 30 to the electric brake device 40 by setting the target output voltage of the second power supply system 30 to a first voltage $V_{b1}$ that is lower than an output voltage of the first power supply system 20 when it does not fail, and does not apply a forward bias to the second rectifier element 60. For example, the first voltage $V_{b1}$ is set lower than an actual measurement value obtained by monitoring the output voltage when the first power supply system 20 does not fail. Alternatively, the first voltage $V_{b1}$ may be set lower than an assumed range of the output voltage when the first power supply system 20 does not fail. However, the first voltage $V_{b1}$ does not have to be too low, and may be higher than, for example, a predetermined failure detection voltage $V_d$ to be described below. As such, when the first power supply system 20 fails, power can be quickly supplied from the second power supply system 30 to the electric brake device 40. This process may be performed before step S101.

Step S103: The failure detection unit 11 detects whether there is a failure in the first power supply system 20. When a failure in the first power supply system 20 is detected (Yes in step S103), the process proceeds to step S104. When no failure is detected (No in step S103), the process proceeds to step S106.

The failure detection unit 11 can detect the failure in the first power supply system 20 by acquiring the output voltage of the first power supply system 20 and detecting the fact that the acquired output voltage is equal to or lower than the failure detection voltage $V_d$. The failure detection voltage $V_d$ is set, for example, lower than an assumed range of the output voltage when the first power supply system 20 does not fail. Alternatively, in order to more accurately detect a failure, the failure detection unit 11 may detect the failure when a state in which the output voltage of the first power supply system 20 is equal to or lower than the predetermined failure detection voltage $V_d$ continues for a predetermined time.

Figure 5:
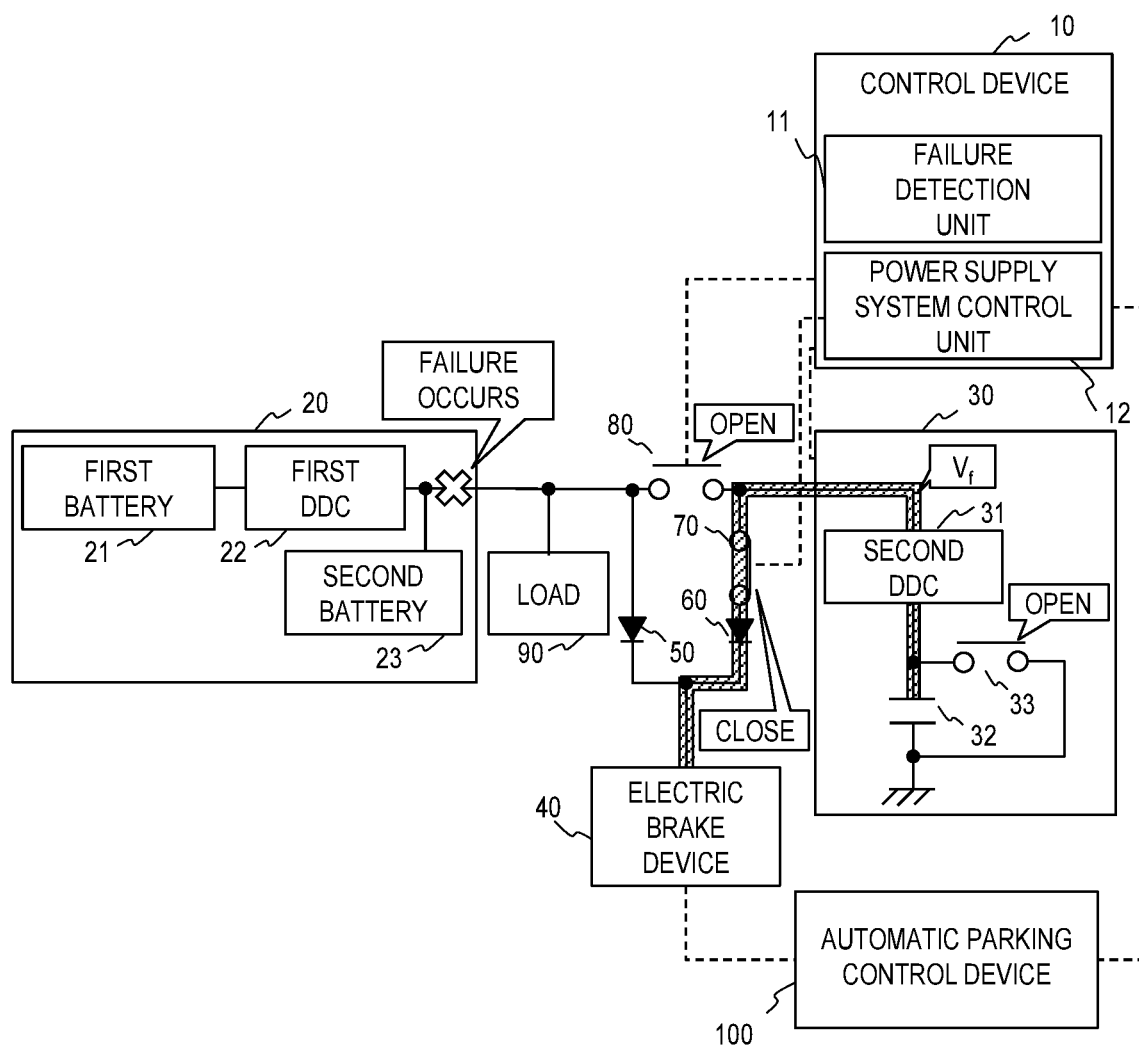
FIG. 5 is yet another diagram describing the control by the control device according to one embodiment.

Step S104: When acquiring the detection result indicating that the failure is detected from the failure detection unit 11, the power supply system control unit 12 sets the target output voltage of the second power supply system 30 to an electric brake operation voltage $V_f$. Specifically, the target output voltage is set by issuing a command, corresponding to the target output voltage, to the second DCDC converter 31. As such, power can be actually supplied from the second power supply system 30 to the electric brake device 40, as illustrated in FIG. 5. The time period from when the command for setting the target output voltage is issued to when the output voltage of the second power supply system 30 actually follows the command is generally shorter than the time period required for opening and closing the relay. The electric brake operation voltage $V_f$ is a voltage within a range in which the electric brake device 40 can stop the vehicle, and may be a fixed value or a variable value as long as it is within this range. Moreover, the power supply system control unit 12 brakes the vehicle by operating the electric brake device 40. In addition, as described above, when the first voltage $V_{b1}$, which is the target output voltage of the second power supply system 30, is set higher than the failure detection voltage $V_d$ in step S102, compared to when the first voltage $V_{b1}$ is set equal to or lower than the failure detection voltage $V_d$, it is possible, in this step, to shorten the required time period from when the target output voltage of the second power supply system 30 is set to the electric brake operation voltage $V_f$ to when the output voltage actually reaches the electric brake operation voltage $V_f$.

Step S105: The power supply system control unit 12 acquires information such as the speed of the vehicle, and determines whether the vehicle can stop. When the vehicle can stop (Yes in step S105), the process proceeds to step S110. Otherwise (No in step S105), step S105 is repeated until it is confirmed that the vehicle has been stopped.

Step S106: The power supply system control unit 12 acquires the speed of the vehicle and determines whether the speed of the vehicle is lower than a predetermined speed SPD to be described below. When the speed of the vehicle is lower than the speed SPD (Yes in step S106), the process proceeds to step S107. Otherwise (No in step S106), the process returns to step S103.

Step S107: The power supply system control unit 12 controls the second power supply system 30, such that power is supplied from the second power supply system 30 to the electric brake device 40 even when the first power supply system 20 does not fail by increasing the target output voltage of the second power supply system 30. For example, the power supply system control unit 12 sets the target output voltage of the second power supply system 30 to a second voltage $V_{b2}$, which is determined based on the output voltage of the first power supply system 20 and the voltage drop amount of the first rectifier element 50 and the second rectifier element 60, and is equal to or higher than a voltage that applies the forward bias to the second rectifier element 60. As such, power is supplied, to the electric brake device 40, from both the first power supply system 20 and the second power supply system 30, or from only the second power supply system 30. As described above, near the end of parking after the speed of the vehicle becomes lower than the speed SPD by the operation of the electric brake device 40, power is supplied from the second power supply system 30 to the electric brake device 40. Thus, the power charged in the capacitor 32 can be effectively utilized, and worsening of fuel efficiency of the vehicle can be restrained. The speed SPD is set such that a certain power storage amount of the capacitor 32 can be secured even when power supply is started from the second power supply system 30 to the electric brake device 40, and thereafter, when the first power supply system 20 fails, the output voltage of the second power supply system 30 can be reliably maintained at the electric brake operation voltage $V_f$ until the vehicle is stopped.

Step S108: The power supply system control unit 12 can acquire information indicating that the execution of the automatic parking function has been ended from the automatic parking control device 100, and determine whether the execution of the automatic parking function has been ended. When the execution of the automatic parking function has been ended (Yes in step S108), the process proceeds to step S109. Otherwise (No in step S108), the process returns to step S103.

Step S109: The control device 10 acquires information indicating the power supply state of the vehicle and determines whether the ignition has been turned off. When the ignition has been turned off (Yes in step S109), the process proceeds to step S110. Otherwise (No in step S109), step S109 is repeated until the ignition-off is confirmed. In addition, the ignition is turned off according to, for example, an instruction from the automatic parking control device 100 or a user after the execution of the automatic parking function is ended.

Figure 6:
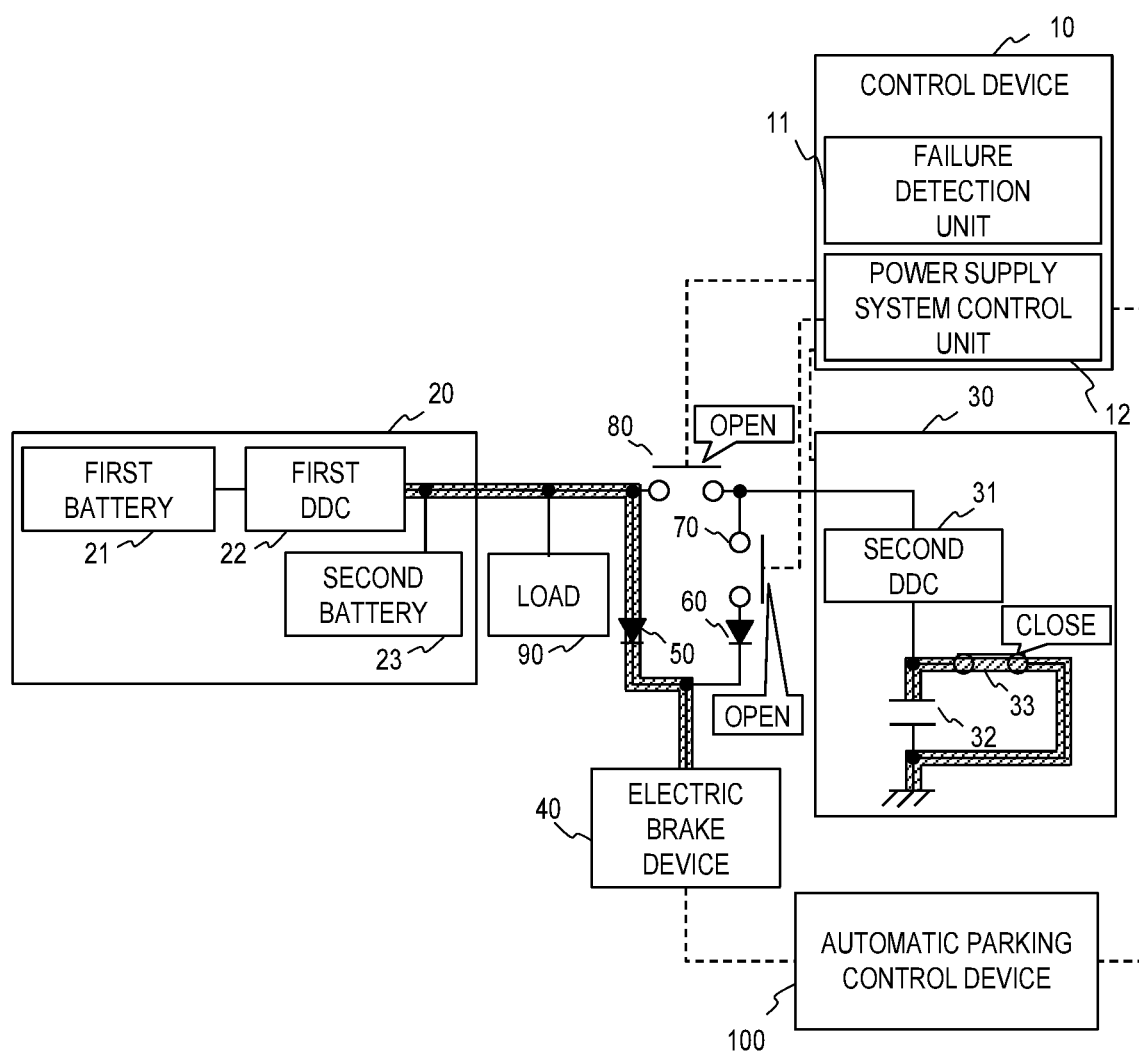
FIG. 6 is still another diagram describing the control by the control device according to one embodiment.

Step S110: The power supply system control unit 12 starts discharging the capacitor 32 by opening the third relay 70 and closing the first relay 33, as illustrated in FIG. 6. Moreover, in this process, although the power supply system control unit 12 does not have to open the third relay 70, by opening the third relay 70, it is possible to reliably restrain an unexpected influence on the electric brake device 40 or the first power supply system 20 at the time of discharging.

Step S111: The power supply system control unit 12 acquires the voltage of the capacitor 32 and determines whether the voltage has become lower than a predetermined lower limit voltage $V_e$. When the voltage of the capacitor 32 becomes lower than the lower limit voltage $V_e$ (Yes in step S111), the process is ended. Otherwise (No in step S111), step S110 is repeated. The lower limit voltage $V_e$ is set to a voltage at which the capacitor 32 does not deteriorate even when left for a long time. As such, it is possible to restrain the deterioration of the capacitor 32. Further, it is possible to restrain the power supply system control unit 12 from standing by for a long time until the capacitor 32 is completely discharged.

The power supply system control unit 12 may acquire the voltage of the capacitor 32 before the process of step S110, and end the process without performing steps S110 and S111 when the acquired voltage is lower than the lower limit voltage $V_e$. Moreover, the second power supply system 30 may be provided with another power supply source, such as a secondary battery, instead of the capacitor 32. In this case, when the power supply source does not deteriorate even without being discharged, the discharging process in steps S110 and S111 may be omitted.

Advantageous Effect

As described above, the control device 10 according to one embodiment of the present disclosure closes the third relay 70 in advance at the start of the performance of the autonomous parking function, such that the second power supply system 30 is electrically connected to the electric brake device 40. As such, it is possible to eliminate a time lag caused by switching the state of the relay which is required when the second power supply system 30 is electrically connected to the electric brake device 40 through the relay, or the like, after the first power supply system 20 fails. Therefore, even when the first power supply system 20 fails, the vehicle can be quickly braked and stopped by the second power supply system 30.

Further, the target output voltage of the second power supply system 30 in a state in which the first power supply system 20 does not fail is set lower than the output voltage of the first power supply system 20 in a state in which it does not fail. As such, the power in the second power supply system 30 is not supplied to the electric brake device 40, and thus it is possible to maintain power storage amount of the second power supply system 30 in preparation for an occurrence of a failure in the first power supply system 20.

Moreover, when the speed of the vehicle becomes lower than the predetermined speed SPD, the target output voltage of the second power supply system 30 is set to a predetermined second voltage $V_{b2}$, which is equal to or higher than the failure detection voltage $V_d$. As such, near the end of parking after the speed of the vehicle becomes lower than the speed SPD by the operation of the electric brake device 40, power is supplied from the second power supply system 30 to the electric brake device 40. Thus, the power charged in the capacitor 32 can be effectively utilized, and worsening of fuel efficiency of the vehicle can be restrained.

In addition, depending on the type of the automatic parking, the vehicle may be braked a plurality of times by cutting back of a steering wheel, or the like. In this case, for example, in step S106, the control device 10 may acquire information indicating a control state of the electric brake device 40 from the automatic parking control device 100. Then, the process may proceed to step S107 only when the acquired information indicates that the electric brake device 40 is operating for the last stop in the automatic parking and the speed of the vehicle is lower than the speed SPD. Otherwise, the process may return to step S103. As such, during braking other than braking for the last stop, it is possible to maintain the power storage amount of the capacitor 32 in preparation for an occurrence of a failure in the first power supply system 20 without supplying power from the second power supply system 30 to the electric brake device 40.

Modified Examples

In steps S106 and S107 of the above-described embodiment, although the target output voltage of the second power supply system 30 is changed based on the speed of the vehicle, the target output voltage of the second power supply system 30 may be changed based on the voltage of the capacitor 32 in addition to the speed of the vehicle. For example, when the voltage of the capacitor 32 is relatively high and the power storage amount thereof is large, the target output voltage of the second power supply system 30 is set relatively high such that power supply from the second power supply system 30 becomes large. As such, the power charged in the capacitor 32 can be more effectively utilized. Further, when the voltage of the capacitor 32 is relatively low and the power storage amount thereof is small, the target output voltage of the second power supply system 30 is set relatively low such that the power supply from the second power supply system 30 becomes small. As such, the power storage amount in the capacitor 32 can be more reliably maintained in preparation for an occurrence of a failure in the first power supply system 20.

Moreover, in step S104, for example, the control device 10 may store or acquire a map in which the speed of the vehicle at the time when the first power supply system 20 fails, and the corresponding electric brake operation voltage $V_f$ are recorded, and the power supply system control unit 12 may set the electric brake operation voltage $V_f$ corresponding to the speed with reference to the map.

The present disclosure can be applied to a power supply control device of an electric brake device of a vehicle, or the like.

What is claimed is:

1. A controller provided in a vehicle including an electric brake device, a first power supply system and a second power supply system configured to supply power to the electric brake device, and a relay provided between the electric brake device and the second power supply system, the controller comprising:
a failure detection unit configured to detect a failure in the first power supply system; and
a power supply system control unit configured to control power supply to the electric brake device based on a detection result of the failure detection unit,
wherein the power supply system control unit is configured to:
close the relay in a case where an execution of an automatic parking function of the vehicle starts;
cause, during the execution of the automatic parking function, the first power supply system to supply power to the electric brake device without causing the second power supply system to supply power to the electric brake device, by setting a target output voltage of the second power supply system to a first voltage when the failure detection unit does not detect the failure in the first power supply system, the first voltage being lower than an output voltage of the first power supply system;
cause, during the execution of the automatic parking function, the second power supply system to supply power to the electric brake device by setting the target output voltage of the second power supply system to a voltage within a range in which the electric brake device is operable, when the failure detection unit detects the failure in the first power supply system;
acquire a speed of the vehicle; and
cause, during the execution of the automatic parking function, the second power supply system to supply power to the electric brake device by setting the target output voltage of the second power supply system to be higher than the first voltage when the first power supply system does not fail and the speed of the vehicle becomes lower than a predetermined speed.

2. The controller according to claim 1, wherein:
the second power supply system includes a capacitor as a power source; and
the power supply system control unit is configured to perform a process of discharging the capacitor after an ignition is turned off.

3. The controller according to claim 2, wherein the power supply system control unit is configured to:
acquire a voltage of the capacitor; and
end the process of discharging when the voltage of the capacitor becomes lower than a predetermined lower limit voltage by the process of discharging.

4. The controller according to claim 1, wherein the failure detection unit is configured to:
acquire the output voltage of the first power supply system; and
detect the failure in the first power supply system when the output voltage of the first power supply system is equal to or lower than a predetermined failure detection voltage.

5. The controller according to claim 1, wherein the failure detection unit is configured to:
acquire the output voltage of the first power supply system; and
detect the failure in the first power supply system when a state in which the output voltage of the first power supply system is equal to or lower than a predetermined failure detection voltage continues for a predetermined time.

6. The controller according to claim 1, wherein:
the second power supply system includes a capacitor as a power source; and
the predetermined speed is set such that a certain power storage amount of the capacitor is secured even when the power supply is started from the second power supply system to the electric brake device, and then, when the first power supply system fails, the output voltage of the second power supply system is maintained at an operation voltage of the electric brake device until the vehicle is stopped.

7. A controller provided in a vehicle including an electric brake device, a first power supply system and a second power supply system configured to supply power to the electric brake device, and a relay provided between the electric brake device and the second power supply system, the controller comprising:
a failure detection unit configured to detect a failure in the first power supply system; and
a power supply system control unit configured to control power supply to the electric brake device based on a detection result of the failure detection unit,
wherein the power supply system control unit is configured to:
close the relay in a case where an execution of an automatic parking function of the vehicle starts;
cause, during the execution of the automatic parking function, the first power supply system to supply power to the electric brake device without causing the second power supply system to supply power to the electric brake device, by setting a target output voltage of the second power supply system to a first voltage when the failure detection unit does not detect the failure in the first power supply system, the first voltage being lower than an output voltage of the first power supply system; and
cause, during the execution of the automatic parking function, the second power supply system to supply power to the electric brake device by setting the target output voltage of the second power supply system to a voltage within a range in which the electric brake device is operable, when the failure detection unit detects the failure in the first power supply system, wherein:
the second power supply system includes a capacitor as a power source;
the power supply system control unit is configured to:
acquire a speed of the vehicle; and
cause, during the execution of the automatic parking function, the second power supply system to supply power to the electric brake device by setting the target output voltage of the second power supply system to be higher than the first voltage when the first power supply system does not fail and the speed of the vehicle becomes lower than a predetermined speed; and
the target output voltage of the second power supply system is determined based on a voltage of the capacitor.

8. A control method of controlling a vehicle including an electric brake device, a first power supply system and a second power supply system configured to supply power to the electric brake device, and a relay provided between the electric brake device and the second power supply system, the control method comprising:

detecting a failure in the first power supply system;
closing the relay in a case where an execution of automatic parking function of the vehicle starts;
causing, during the execution of the automatic parking function, the first power supply system to supply power to the electric brake device without causing the second power supply system to supply power to the electric brake device, by setting a target output voltage of the second power supply system to a first voltage when the failure in the first power supply system is not detected, the first voltage being lower than an output voltage of the first power supply system;
causing, during the execution of the automatic parking function, the second power supply system to supply power to the electric brake device by setting the target output voltage of the second power supply system to a voltage within a range in which the electric brake device is operable, when the failure in the first power supply system is detected;
acquiring a speed of the vehicle; and
causing, during the execution of the automatic parking function, the second power supply system to supply power to the electric brake device by setting the target output voltage of the second power supply system to be higher than the first voltage when the first power supply system does not fail and the speed of the vehicle becomes lower than a predetermined speed.

* * * * *